(12) United States Patent
Eberlein

(10) Patent No.: US 7,870,656 B2
(45) Date of Patent: *Jan. 18, 2011

(54) METHOD FOR CONNECTING TWO OR MORE METAL SHEETS OR PROFILE PARTS, ESPECIALLY OF AN AUTOMOBILE BODY SEGMENT, AND SAID AUTOMOBILE BODY SEGMENT DESCRIPTION

(75) Inventor: Wolfgang Eberlein, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 26 days.

This patent is subject to a terminal disclaimer.

(21) Appl. No.: 10/946,138

(22) Filed: Sep. 21, 2004

(65) Prior Publication Data

US 2005/0161965 A1  Jul. 28, 2005

(30) Foreign Application Priority Data

Jan. 27, 2004  (DE) ............... 10 2004 003 909

(51) Int. Cl.
*B23P 11/00* (2006.01)
*B23P 17/00* (2006.01)

(52) U.S. Cl. ............ 29/525.14; 29/525.05; 29/524.1; 29/243.53; 219/157

(58) Field of Classification Search ......... 29/525.01, 29/525.03, 525.05, 525.14, 432.1, 509, 524.1, 29/521, 243.53, 522.1, 243.5; 411/179, 181; 219/157

See application file for complete search history.

(56) References Cited

U.S. PATENT DOCUMENTS

| | | | | |
|---|---|---|---|---|
| 1,382,906 A | * | 6/1921 | Gravell | ............. 411/504 |
| 1,691,522 A | | 11/1928 | Kobert | |
| 3,524,042 A | * | 8/1970 | Bennett | ............. 219/150 R |
| 3,878,356 A | | 4/1975 | Roye | |
| 4,037,073 A | * | 7/1977 | Becker | ............. 219/92 |
| 5,752,305 A | | 5/1998 | Cotterill et al. | |
| 5,828,028 A | | 10/1998 | Cecil | |
| 5,957,777 A | | 9/1999 | Singh et al. | |
| 6,107,595 A | * | 8/2000 | Peterson | ............. 219/118 |
| 6,417,490 B1 | | 7/2002 | Liebrecht et al. | |
| 6,742,235 B2 | * | 6/2004 | Blacket et al. | ............. 29/432.2 |
| 6,836,948 B2 | * | 1/2005 | Wang | ............. 29/432.1 |
| 7,267,736 B2 | * | 9/2007 | Hou et al. | ............. 156/91 |

FOREIGN PATENT DOCUMENTS

| | | |
|---|---|---|
| JP | 11033664 | 2/1999 |
| WO | WO 98/01679 | 1/1998 |

* cited by examiner

*Primary Examiner*—David P Bryant
*Assistant Examiner*—Christopher M Koehler
(74) *Attorney, Agent, or Firm*—Reising Ethington P.C.

(57) ABSTRACT

Method for connecting two or more metal sheets or profile parts, especially of an automobile body segment as well as said automobile body segment.

A method is described for joining two or more metal sheets and/or profile parts of which typically one is a high strength steel with the following steps.
a) mechanically joining in a force-locking or frictional manner the metal sheets or profile parts at one or more connecting sites and subsequently
b) thermally joining the connecting sites by means of pressure welding.

With the method according to the invention in particular in the motor vehicle sector automobile body segments can be produced which display qualitatively very high quality point weld joints.

10 Claims, 2 Drawing Sheets

METHOD FOR CONNECTING TWO OR MORE METAL SHEETS OR PROFILE PARTS, ESPECIALLY OF AN AUTOMOBILE BODY SEGMENT, AND SAID AUTOMOBILE BODY SEGMENT DESCRIPTION

CROSS-REFERENCE TO RELATED APPLICATIONS

This application is based upon and claims the benefit of priority of the prior German Patent Application No. 10 2004 003 909.7 filed Jan. 27, 2004, the contents of which are incorporated by reference.

BACKGROUND OF THE INVENTION

Field of Invention

The invention pertains to a method for connecting two or more metal sheets and/or profile parts of which at least one is a high strength steel. The welding of metal sheets and/or profile parts, especially the pressure welding of metal sheets and/or profile parts, is an especially cost-effective method since it can be performed rapidly and without major equipment costs and makes a permanent close fitting joint possible.

However, welding can be used only with limitations since a basic condition for this is that the materials to be welded can be welded together well. Primarily identical or essentially identical metals and metal alloys can be welded to each other. Different metals or alloys such as aluminum and steel or copper and steel can only be welded with great difficulty if at all. In addition frequently different types of steel as well as the same types of steel are difficult to weld together, especially if the welding is to be performed by a pressure welding process, e.g. point welding, projection welding or rolled seam welding. To connect metal sheets and/or profile parts of metals and metal alloys in addition to welding also from the state of the art numerous mechanical connecting procedures are known, such as form-locking joining by rivets or screws. These processes which are usually aimed at mechanically detachable connections, however, have a very reduced strength since as a rule the holes made in them for screwing or riveting act as mechanical "notches." These mechanical "notches" which are formed due to the stamping, drilling or cutting of holes or screw holes frequently lead to stress which may lead to a rapid fatigue of the material in the case of a prolonged load.

Long-term strength such as is achieved by welded joints is usually impossible with form-locking and/or frictional mechanical connections.

In addition it has been shown in particular that a large number of high strength and very high strength steels exist which can be welded together only with difficulty. In particular welding by pressure welding is possible only under very precisely defined welding conditions which are difficult to maintain.

These so-called high strength and ultra high strength steels are used especially in automobile construction in order to achieve light weight automobile body segments. With comparable strength stages, with the high strength and ultra high strength steels, for example, high elongation values and therefore significantly better cold deformability is achieved. In addition the range of safely adjustable strengths is greatly expanded with respect to conventional steels. These high strength and ultra high strength steels accordingly make lightweight construction possible which is due to an increase in the strength properties with a simultaneous reduction of the thickness of the metal sheets or profiles.

The high strength and ultra high strength steels in question include steels which are adjusted by mixed crystal/solid solution hardening, by grain refinement, by precipitation hardening or by a special form of increasing the strength, the so-called "press hardening" process. In the latter process hot deformed metal sheets and/or profile parts are quenched in the tool so that a high content of martensite is formed.

Another important group of high strength and ultra high strength steels is represented by the multiphase steels. The increase in strength in these multiphase steels is achieved by introducing hard phases into the microstructure in addition to soft phases.

A first important group of these multiphase steels is the so-called dual phase steels in which the microstructure essentially consists of ferrite with a martensite content of up to 20%.

A second important group of these multiphase steels is the so-called residual austenite steels which include a basic matrix composed of ferrite and embedded bainite, containing residual austenite components which are transformed by the deformation into hard martensite. These residual austenite steels are also known as TRIP steels. The acronym TRIP stands for Transformation Induced Plasticity.

A third group of these multiphase steels is represented by the so-called complex phase steels. Here in the very fine grained microstructures in a homogeneous distribution fine precipitations are present so that in addition to very hard phases, e.g. martensite, softer microstructure components are present.

A fourth important group is the ferrite-bainite phase steels which display a microstructure of bainite and ferrite.

All of these high strength and ultra high strength steels, because of their multiphase and brittle-phase containing microstructure, have in common the fact that they can be welded only very poorly. In particular steels which contain hard phases such as are represented by bainite and martensite or in which due to welding such hard phases are increasingly formed are difficult to join by pressure welding, especially by point welding in a form locking manner. As a rule in the welding spot microstructures too high contents of martensite and/or bainite accumulate which lead to embrittlement and therefore to a limited or poor long-term strength of the weld.

In addition, it has been found that the above mentioned high strength steels are not merely difficult to weld to one another if at all. A weld joint even with easily weldable steels, e.g. conventional soft steels, is possible only with limitations. Here also frequently cracks are seen which can occur, on the one hand, on the surfaces of the welded point and also in the interior of the weld spot structure.

In addition, the high strength and ultra high strength steels display a back-springing or rebounding behavior which can lead to problems in the case of pressure welding, especially point welding.

These back-springing properties require increased equipment costs. As a result of the back-springing of the high strength and ultra high strength steels a gap usually forms between the metal sheets and/or profiles to be welded. This gap which forms in the press, however, must be compensated in the case of pressure welding, especially in the case of point welding, by a strong increase in the strength of the point welds. This requires an adaptation of the point welding forces to be applied as a function of the gap thicknesses to be compensated in each case.

The pressing together of the back-springing metal sheets or profile parts with the aid of the welding clamps used in pressure welding or point welding has the result that after the point welding the still hot weld point which has not yet achieved its full strength must accept the stresses inside the metal sheet or profile part which occur as a result of being clamped together. In order to overcome this problem the welding tongs or clamps accordingly must remain closed for a longer post-holding time. This in turn leads to a lengthening of the cycle times in production. The lengthening of the cycle times in turn causes a reduction in throughput of the finishing line. A reduction in the throughput in turn results in a greater cost for the finished products.

BRIEF SUMMARY OF THE INVENTION

The objective of the present invention is therefore to devise a new method for joining two or more metal sheets and/or profile parts, especially in automobile body construction, at least one of which includes a high strength steel. The method is intended to prepare a permanent production-safe weld joint by overcoming the above mentioned difficulties, while simultaneously the welding time should be reduced compared to conventional point welding. According to the invention this problem is solved by a method for joining two or more metal sheets and/or profile parts of which at least one includes a high strength steel, with the following steps:

a) force-locking and/or frictional mechanical joining of metal sheets and/or profile parts at one or more weld sites and subsequently b) thermally joining the connecting sites by pressure welding.

With this method it is possible, on the one hand, to form rapidly and exceptionally stable mechanical joints between the two metal sheets and/or profile parts to be connected so that the gaps appearing as the result of the back-springing properties of the high strength steel being worked can be effectively and efficiently closed in the press, and in the subsequent welding of the connecting sites by pressure welding while avoiding the uneconomical and time consuming readjustment of the point welding forces to be applied via the welding clamps.

With this method, on the one hand, different types of steel can be welded to each other of which at least one steel type is poorly weldable, such as the high and ultra high strength steels. On the other hand, naturally, also the same types of steel which are poorly weldable can be joined together. The method is accordingly suitable not only for joining high strength and ultra high strength steels to each other but also for joining high strength and ultra high strength steels to conventional easily weldable soft steels.

The method is also suitable for joining high strength steels with other metals or metal alloys. A joint is especially possible between aluminum and high strength steel.

In particular the method is applicable with the initially mentioned press hardening steels, dual phase steels, the ferrite-bainite phase steels, the residual austenite steels, the complex phase steels as well as the martensite phase steels.

In a first variant of the present invention the mechanical joining takes place by means of penetration joints. Penetration joining is also known under the term "clinching". After the metal sheets and/or profile parts to be joined are provided with a clinching point, in the depression of the clinching point a usually flat piece of welding material is inserted and the clinching point provided with the weld material is subsequently pressure welded.

In an alternative version of the present invention the mechanical joining is accomplished with a connecting piece. The connecting pieces are subsequently used in pressure welding as weld material. One variant for this mechanical joining is riveting. Another variant is screwing. The rivets and/or screws inserted into the prestamped holes then serve during the subsequent pressure welding as weld material.

Another variant of the present invention is form-locking and frictional mechanical joining of the metal sheets and/or profiles to be joined by punched rivets. The punched rivets inserted into the metal sheets and/or profile parts to be joined then in turn serve as weld material in the subsequent pressure welding process.

In the method according to the present invention it is important that the connecting pieces used, which may be, for example, the above mentioned rivets, screws or punched rivets or the welding material used in the clinch joint, are easily weldable steel. Easily weldable steels are usually soft steels which have a pure ferritic or a ferritic-perlitic microstructure, e.g., steels according to the European Standard EN 10130, especially types DC 04, DC 05 and DC 06.

In addition, the connecting pieces may be surface hardened, e.g. by surface nitriding, so that an especially good punching behavior is achieved since the punched rivets are less strongly plastically deformed. For surface hardening of the connecting pieces in addition to the surface nitriding also annealing and subsequent quenching come into consideration. Likewise a brief induction hardening or flame hardening of the connecting pieces at the edges is conceivable.

Steel DC 06 is an IF steel, therefore a so-called "interstitial free" steel. For IF steels the mechanical properties are achieved by the total blocking of the elements carbon and nitrogen lowered to the lowest content in the steel mill by vacuum treatment by microalloying with niobium and/or titanium in combination with corresponding rolling and annealing conditions.

The connecting pieces may also be provided with a thin metallic coating such as zinc, nickel or copper, which improves the metallurgical connection to the metal sheets and/or profile parts to be joined. In particular with such coatings a positive effect can be exerted on the formation of mixed compounds and/or diffusion compounds in the region of the welding spot microstructure.

The pressure welding method employed is typically electrical resistance welding. In the case of electrical resistance welding in turn point welding is preferred. However, it is also possible to use another electrical resistance welding method, e.g. projection welding or rolled seam welding.

The method according to the invention is especially well suited in the field of automotive engineering and there especially in the production of body segments which are to be prepared by lightweight construction with high strength and ultra high strength steels.

However, it is also possible to use the method for other tasks, e.g., in shipbuilding, in the military sector, in construction or in special fields of machine building where the use of high strength and/or ultra high strength steels is recommended.

In the case of use in auto body construction, with the method according to the invention automobile body segments can be produced by the lightweight construction method which are characterized by the fact that the weld joint points typically produced by point welding between the fabricated high strength and ultra high strength steels are free of cracks and can be produced very rapidly with relatively low equipment costs.

In addition, the quality testing of the weld points produced is considerably simplified since the weld points also display purely ferritic and/or ferriticperlitic weld spot microstructures with low contents of bainite or martensite which can be tested by the known ultrasonic testing processes since these weld spot microstructures display a good contrast from the microstructure of the welded metal sheets or profiles.

It has been found, in other words, that the ultrasonic test method for the detection of cracks in the region of the weld point surfaces and/or the weld point interiors can be used only conditionally in the case of point weld joints of high strength and/or ultra high strength steels of the state of the art. By a series of metallographic studies on micropolished sections of the weld spot microstructure and by various color penetration methods it could be verified that cracks occur there which cannot be detected by the ultrasonic test method.

With the method according to the invention accordingly in a throughput time elevated compared to the state of the art automobile body segments can be produced which display a strongly elevated production safety compared to the state of the art. The method according to the invention accordingly makes it possible not only to achieve faster production but also a significantly simplified and faster quality testing of the finished automobile body segments.

Moreover, the present invention offers the additional advantage that compared to conventionally produced automobile body segments which contain high strength and/or ultra high strength steels a repair of defective weld connection points is rapidly possible without problem since the weld joints can be improved without maintaining a very difficult welding process window. This opens up an easy and economical possibility for repairs not only in the production line but also during the repair of already delivered motor vehicles at repair shops.

BRIEF DESCRIPTION OF THE DRAWINGS

The invention is illustrated in the drawing by an example and described below with reference to the drawing in which FIGS. 1a) through f) in a schematic representation show the course of the method according to the present invention.

DETAILED DESCRIPTION OF THE INVENTION

Figure 1A:
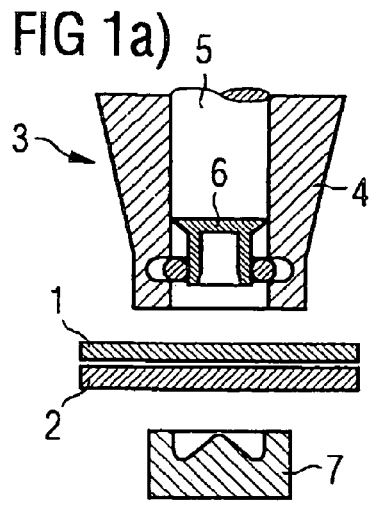

According to the drawing first a first metal sheet 1 and a second metal sheet 2 are prepared which are placed against each other and form a package. Both the first metal sheet and also the second metal sheet shown here are a high strength steel. Both metal sheets have a thickness of approximately 1.5 mm.

The first metal sheet 1 and the second metal sheet 2 are then introduced into a punched rivet setting tool 3. The punched riveting tool 3 consists of a feed beak 4 in which a plunger 5 is arranged. The feed beak 4 guides the plunger 5, at which time at the bottom end of the plunger 5 a punch rivet 6 is arranged. The feed beak 4 with the plunger 5 in it and the introduced punch rivet 6 is situated above the package to be joined together of the first metal sheet and the second metal sheet 2. Below this package to be joined is a matrix 7.

Figure 1B:
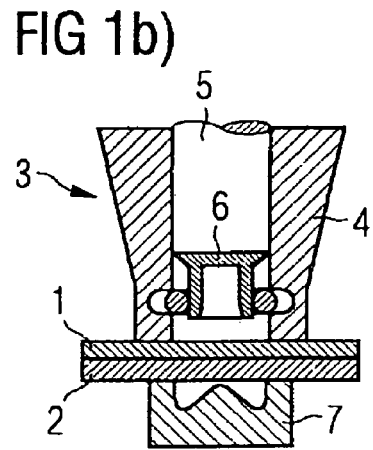
Figure 1C:
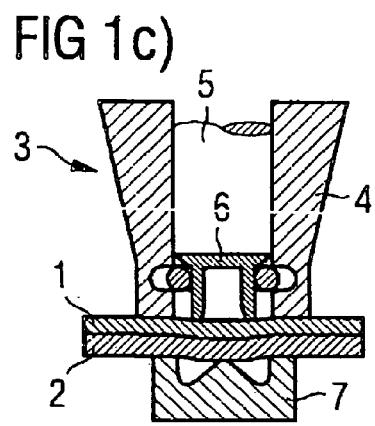
Figure 1D:
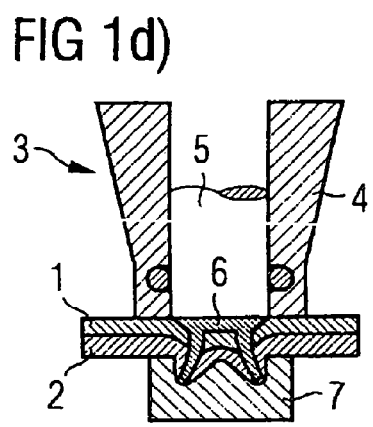

After the first metal sheet and the second metal sheet have been introduced into the punch rivet setting tool 3, as shown in FIG. 1a, the package is clamped by the feed beak 4 above it and the matrix 7 below it. This is shown in FIG. 1b. After this the actual punch riveting method is started as shown in FIG. 1c. At this time the punch rivet 6 to be used which is designed as a semi-hollow rivet is pressed on the first metal sheet 1 so that the first metal sheet 1 is penetrated. The punch riveting process terminates when the punch rivet 6 subsequently spreads out in the lower second sheet 2 as shown in FIG. 1d. The two metal sheets 1 and 2 are then form-locking and frictionally-mechanically joined together.

The punch rivet used here is a high strength IF steel, therefore a so-called high strength "interstitial free" steel. In IF steels the mechanical properties are achieved by the complete blocking of the carbon and nitrogen lowered in the steel mill to the lowest content by vacuum treatment by microalloying with niobium and/or titanium in combination with corresponding rolling and annealing conditions. To increase the strength, manganese and/or phosphorus are alloyed in.

In addition here the punch rivet geometry, the shape of the matrix 7 and the joining forces exerted are matched to the material properties of the metal sheets 1 and 2 to be joined of residual austenite steel.

Figure 1E:
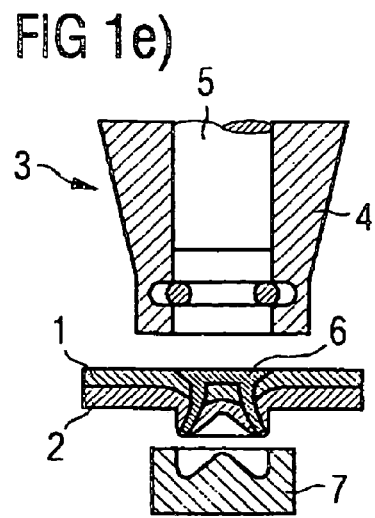

After production of the finished punched rivet joint the feed beak 4 located above the package is removed together with the plunger 5 located in it and the matrix 7 on the bottom side is removed from the connection site, as shown in FIG. 1e.

Then the metal sheets 1 and 2 provided with a punched rivet 6 are inserted into the point welding apparatus 8. The point welding apparatus has a power mains connections (not shown), a welding current source (not shown) and two copper electrodes 9 and 10.

The copper electrodes 9 and 10 are seated on the surface of the punched rivet 6 located in the package and on the bottom side of the second metal sheet 2 containing the punched rivet 6. Then the package including the punched rivet 6, the first metal sheet 1 and the second metal sheet 2 are pressed together to create a frictional lock by the copper electrodes 9 and 10, at which time the transformer located in the welding current source generates a high current which heats the package.

Because of the relatively small diameter of the copper electrodes 9 and 10 in the region of the welding site being produced the electrical current is guided through a very narrow cross-section. This effect is further intensified by the electrical resistance of the package. As soon as the package in the region of the stamped rivet 6 has passed into a doughy state, the copper electrodes 9 and 10 press the package together so that they are metallurgically joined. The electrical current is then switched off and the package cooled in the region of the weld site. Then the welded package is removed from the point welding apparatus 8.

Figure 2A:
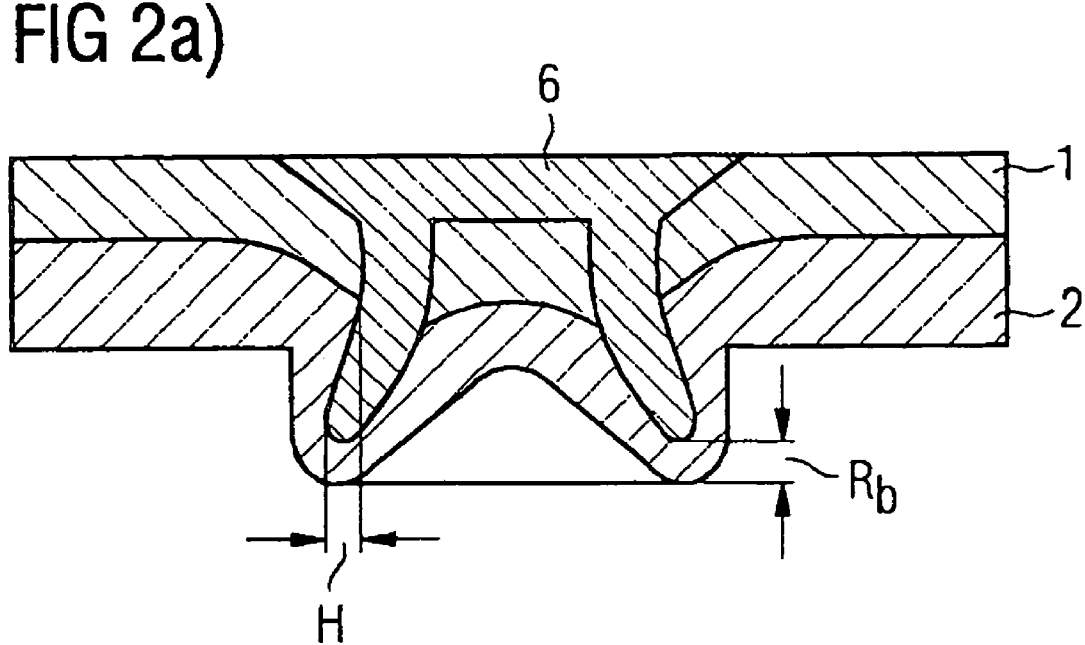
FIG. 2a) the grinding pattern with a characteristic markings of a punched rivet connection which was produced by the method in FIGS. 1a through e, and FIG. 2b) the grinding pattern with the characteristic markings of a stamped rivet connection which was produced by the method steps from FIGS. 1a through f.

FIG. 2a shows a punched rivet connection in polished section, in which a punched rivet 6 with a countersunk head is used. Because of the back taper H and the remaining residual bottom strength $R_b$, by the process performed in FIGS. 1a-e a force-locking and frictional mechanical connection is formed.

Figure 1F:
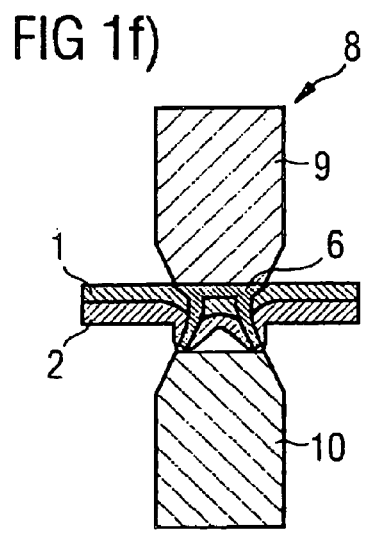
Figure 2B:
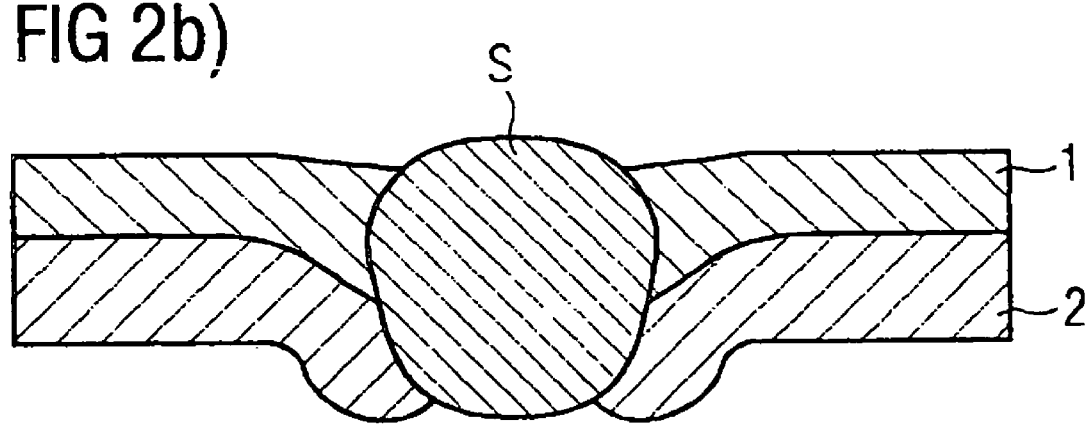

After the point welding is performed, from FIG. 1f, this form-locking and frictional mechanical connection passes over into a material connection whose polished section is shown in FIG. 2b.

The weld spot microstructure S shown there is almost free of bainite and martensite in its interior because of the punch rivet 6 of high strength IF steel used there. The weld spot microstructure S is primarily of ferritic and/or ferritic/perlitic microstructure.

The microstructure also displays mixed compounds and diffusion compounds on its edges pointing toward the first metal sheet 1 and second metal sheet 2. The microstructure at these edges represents a hardening microstructure.

The entire weld spot microstructure S has a high ductility and is free of cracks especially in the interior. Compared to the conventional weld spot microstructures of point welded high strength steels and/or ultra high strength steels in these weld spot microstructures S also on the surfaces no cracks appear.

The invention claimed is:

1. A method of joining two or more metal sheets or profile parts comprising:
    a) joining the metal sheets or profile parts at one or more connecting sites by installing a punched rivet at each connecting site and subsequently
    b) thermally joining the connecting sites by pressure welding to weld the punched rivet and to form a resulting weld spot, wherein substantially all of the material of the punched rivet is melted during the pressure welding to form the weld spot, and at least a portion of the material of each of the metal sheets or profile parts is melted during the pressure welding to form the weld spot.

2. The method as in claim 1 in which the metal sheets or profile parts are different types of steel.

3. The method as in claim 1 in which the metal sheets or profile parts are the same types of steel.

4. The method as in claim 1 in which the pressure welding comprises electrical resistance welding.

5. The method as in claim 4 in which the pressure welding is accomplished by point welding.

6. Use of a method as in claim 1 for producing a body portion for a motor vehicle.

7. A method as set forth in claim 1 wherein the rivet is semi-hollow.

8. A method as set forth in claim 7 wherein the installing a punched rivet further comprises causing the rivet to spread out in the second metal sheet or second profile part.

9. A method as set forth in claim 7 wherein a portion of the first metal sheet and a portion of the second metal sheet or a portion of the first profile part and a portion of the second profile part are received in a hollow portion of the rivet during the installing of the punched rivet.

10. A method as set forth in claim 1 wherein the installing a punched rivet is conducted so that the rivet does not penetrate the second sheet or the second profile part and so that a portion of the second sheet or second profile part covers an end of the rivet and so that a residual bottom strength remains in the second sheet or second profile part.

* * * * *